(12) United States Patent
Su (10) Patent No.: US 8,902,574 B2
(45) Date of Patent: *Dec. 2, 2014

(54) PORTABLE ELECTRONIC DEVICE

(75) Inventor: Hou-Chu Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 124 days.

This patent is subject to a terminal disclaimer.

(21) Appl. No.: 13/546,764

(22) Filed: Jul. 11, 2012

(65) Prior Publication Data

US 2013/0021729 A1  Jan. 24, 2013

(30) Foreign Application Priority Data

Jul. 20, 2011  (TW) .............................. 100125637 A (51) Int. Cl.
*H05K 7/00* (2006.01)
*G06F 1/16* (2006.01)

(52) U.S. Cl.
CPC ............ *G06F 1/1656* (2013.01); *G06F 1/1698* (2013.01); *G06F 2200/1632* (2013.01)
USPC ................. 361/679.12; 361/692; 361/679.09; 361/802; 361/800; 361/801

(58) Field of Classification Search
CPC ....................................................... H05K 7/00
USPC ...... 361/810, 800, 801, 802, 803; 174/138 E, 174/138 G; 292/DIG. 37, 163, 146, 219, 292/198, 203
See application file for complete search history.

(56) References Cited

U.S. PATENT DOCUMENTS 3,744,864 A * 7/1973 Schmitz ......................... 312/244
8,446,715 B2 * 5/2013 Su et al. .................... 361/679.12

FOREIGN PATENT DOCUMENTS

| CA | 816262 A | 6/1969 |
| CN | 2537082 Y | 2/2003 |
| CN | 2914181 Y | 6/2007 |
| CN | 201150157 Y | 11/2008 |

* cited by examiner

Primary Examiner — Jayprakash N Gandhi
Assistant Examiner — Mandeep Buttar
(74) Attorney, Agent, or Firm — Dickstein Shapiro LLP (57) ABSTRACT

A portable electronic device includes a case, a push-push mechanism, and an element. The push-push mechanism includes a hollow column disposed in the case and having alternately arranged long grooves and short grooves, a pushing component having an inner end portion extending into the hollow column, a rotating component movably disposed in the hollow column, and a spring disposed for biasing the rotating component toward the pushing component. The pushing component is movable together with the element relative to the hollow column between a received position and an ejected position, where the positioning teeth are slidably and respectively received in the long grooves and the element is ejected out of the case.

11 Claims, 11 Drawing Sheets

PORTABLE ELECTRONIC DEVICE

CROSS-REFERENCE TO RELATED APPLICATION

This application claims priority of Taiwanese Patent Application No. 100125637, filed on Jul. 20, 2011, the disclosure of which is incorporated herein by reference.

BACKGROUND OF THE INVENTION

1. Field of the Invention

The invention relates to a portable electronic device, and more particularly to a portable electronic device having a push-push mechanism.

2. Description of the Related Art

In a conventional notebook computer, an antenna is concealed inside a case of the notebook computer. In consideration of the appearance design, the case of the notebook computer may be made of metal. However, the metal case has a shielding effect on the antenna concealed therein, thereby degrading the signal transmission and receiving efficiency of the antenna. Therefore, if an electronic device having a push-push mechanism can be developed so that an antenna can be moved by the push-push mechanism to a position not shielded by a case of the electronic device when the antenna is in use, the electronic device will meet the requirements of appearance design and antenna transmission efficiency.

SUMMARY OF THE INVENTION

Therefore, the object of the present invention is to provide a portable electronic device having a push-push mechanism capable of ejecting an antenna or other elements.

Accordingly, a portable electronic device of the present invention comprises a case formed with an opening, a push-push mechanism, and an element. The push-push mechanism includes a hollow column, a pushing component, a rotating component and a spring. The hollow column is disposed in the case, and has an inner surrounding surface, a plurality of long grooves separately formed in the inner surrounding surface, and a plurality of short grooves shorter than the long grooves, formed in the inner surrounding surface, and disposed alternately with the long grooves. The pushing component has an outer end portion disposed in the case at a position adjacent to the opening, an inner end portion extending from the outer end portion into the hollow column, and a plurality of first engaging teeth disposed annularly on the inner end portion. The rotating component is movably disposed in the hollow column and includes a ring member, a plurality of positioning teeth separately protruding from an external surface of the ring member, and a plurality of second engaging teeth disposed annularly on the ring member and abutting against the first engaging teeth. The spring is disposed in the hollow column and biases the rotating component toward the pushing component. The element is connected to the outer end portion of the pushing component. The pushing component is capable of moving relative to the hollow column between a received position, where the positioning teeth engage respectively with the short grooves and the element is located within the case, and an ejected position, where the positioning teeth are slidably and respectively received in the long grooves and the element is ejected out of the case through the opening.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Before this invention is described in detail, it should be noted that, in the following description, similar elements are designated by the same reference numerals.

Figure 1:
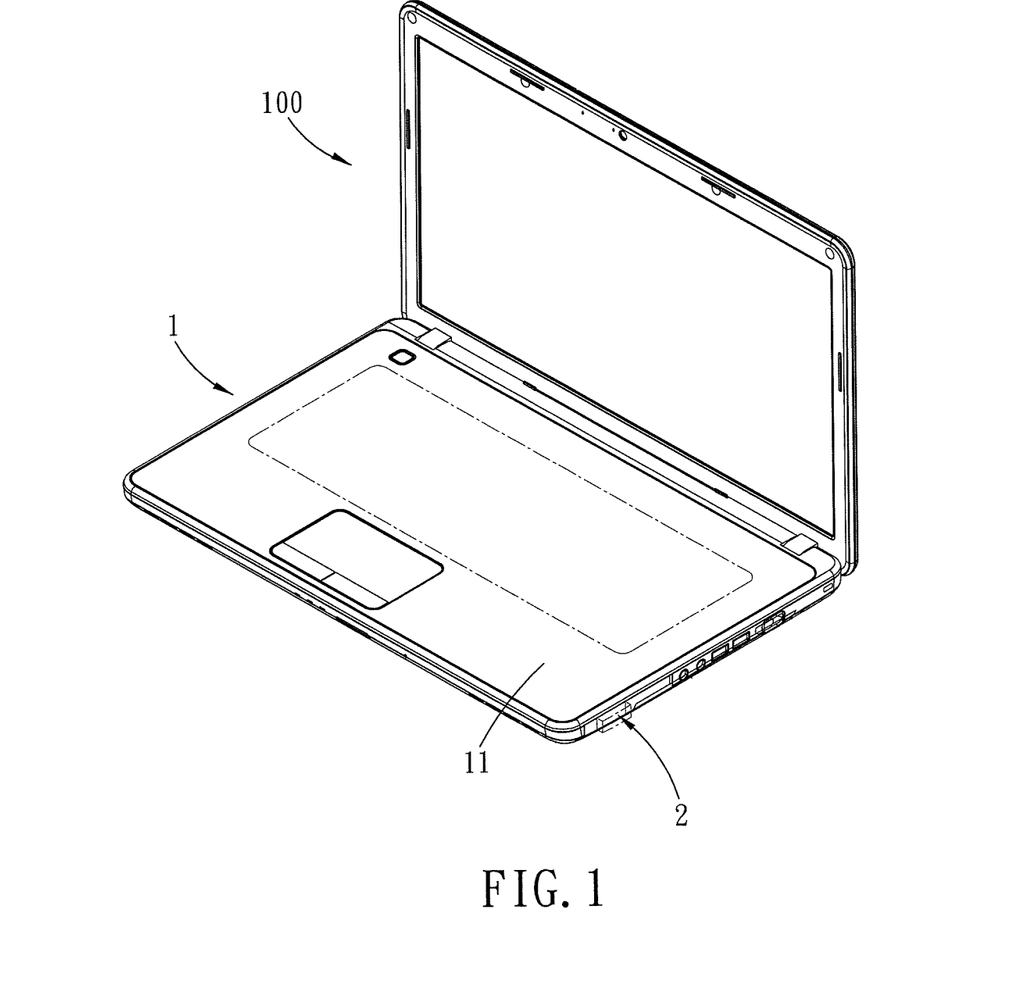
FIG. 1 is a perspective view of a first embodiment of a portable electronic device according to the present invention.
Figure 2:
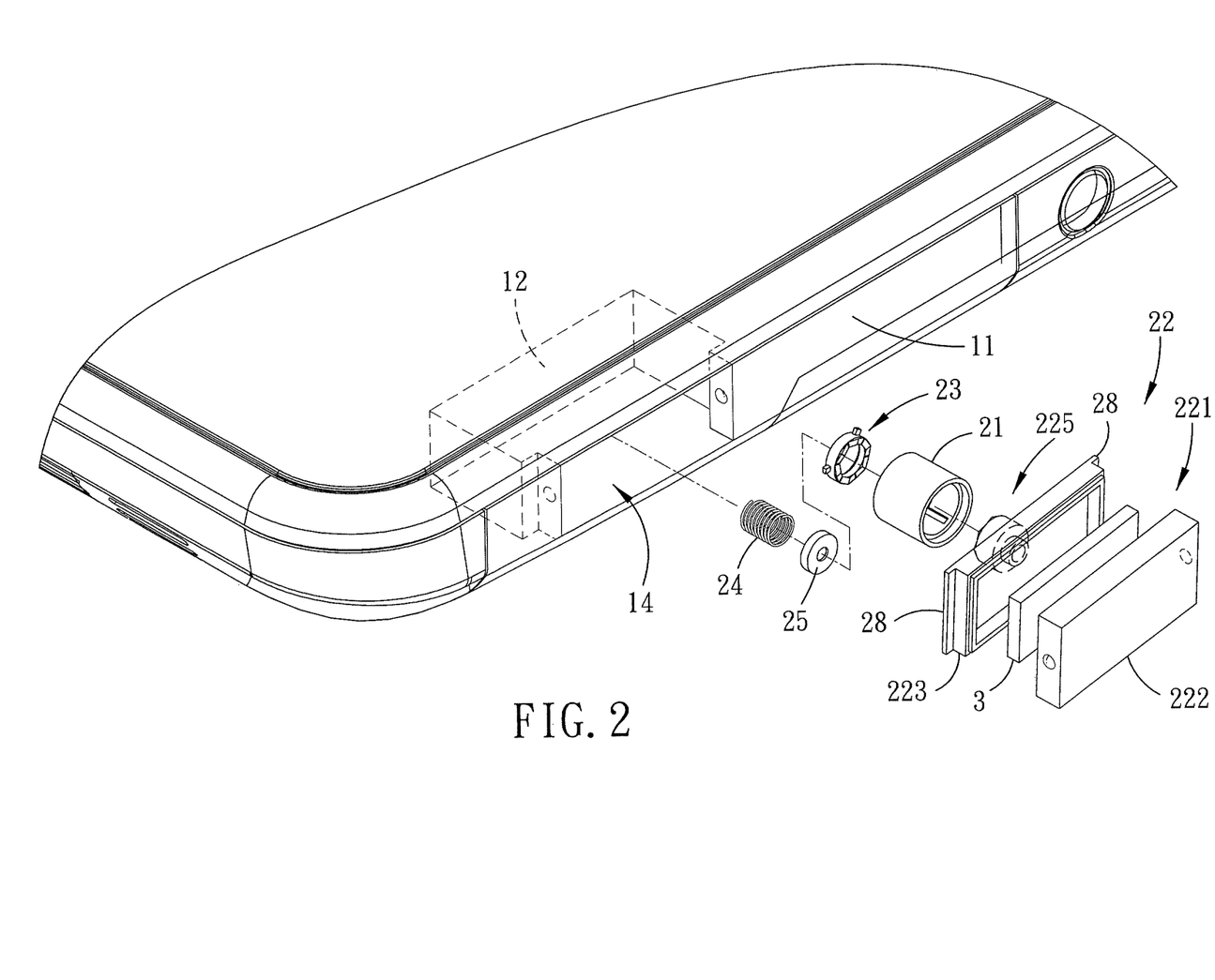
FIG. 2 is a fragmentary exploded perspective view of the first embodiment of the portable electronic device according to the present invention, illustrating a case, an antenna and a push-push mechanism.

FIGS. 1 and 2 show a first embodiment of a portable electronic device 100 according to the present invention. The portable electronic device 100 comprises a case 1, a push-push mechanism 2 connected to the case 1, and an element 3 disposed on the push-push mechanism 2. In this embodiment, the portable electronic device 100 is exemplified using a notebook computer, and the element 3 is exemplified using an antenna. Alternatively, the portable electronic device 100 may be a tablet computer, a personal digital assistant or the like, and the element 3 may be a built-in speaker, a stylus, a light or the like.

Figure 3:
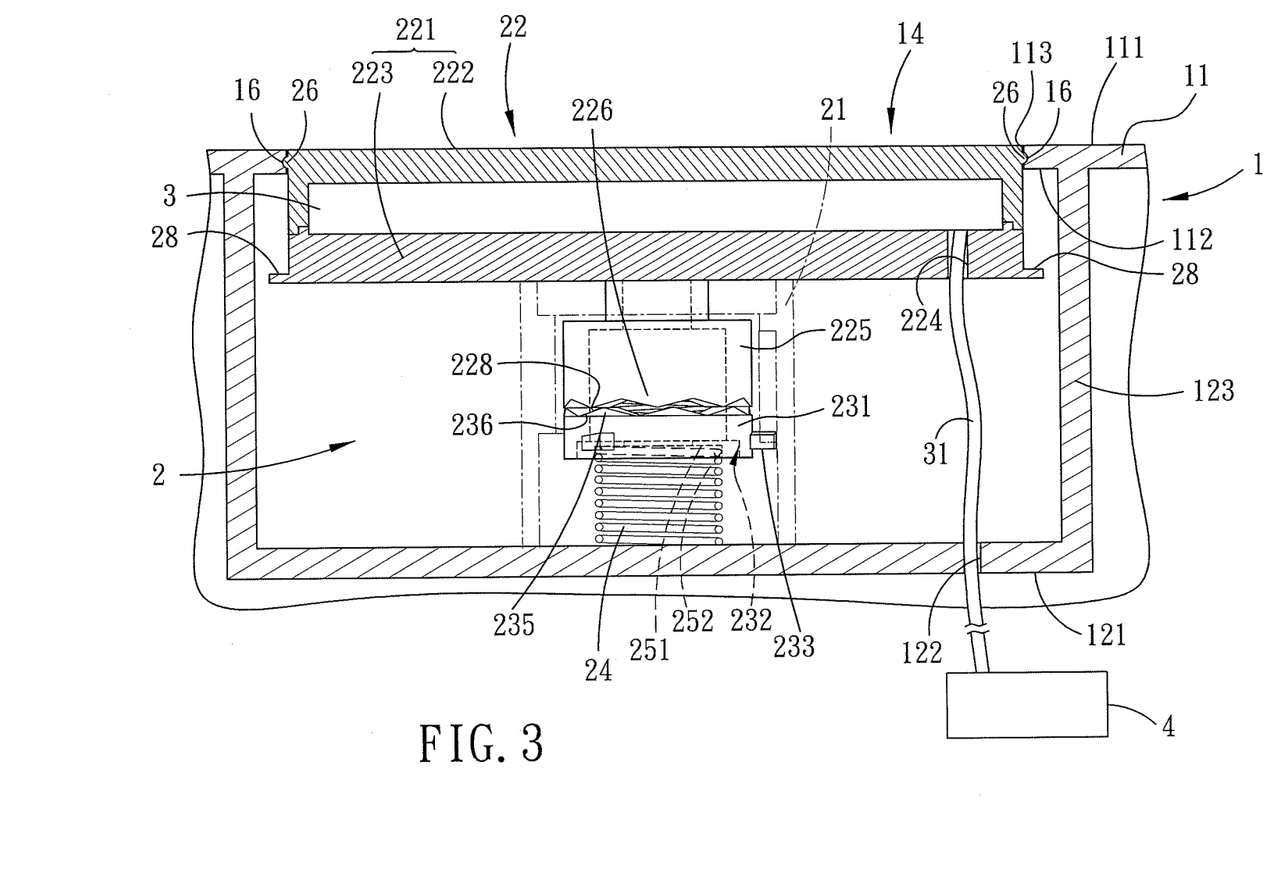
FIG. 3 is a fragmentary sectional view of the first embodiment, illustrating a pushing component at a received position, and the antenna located within the case.
Figure 4:
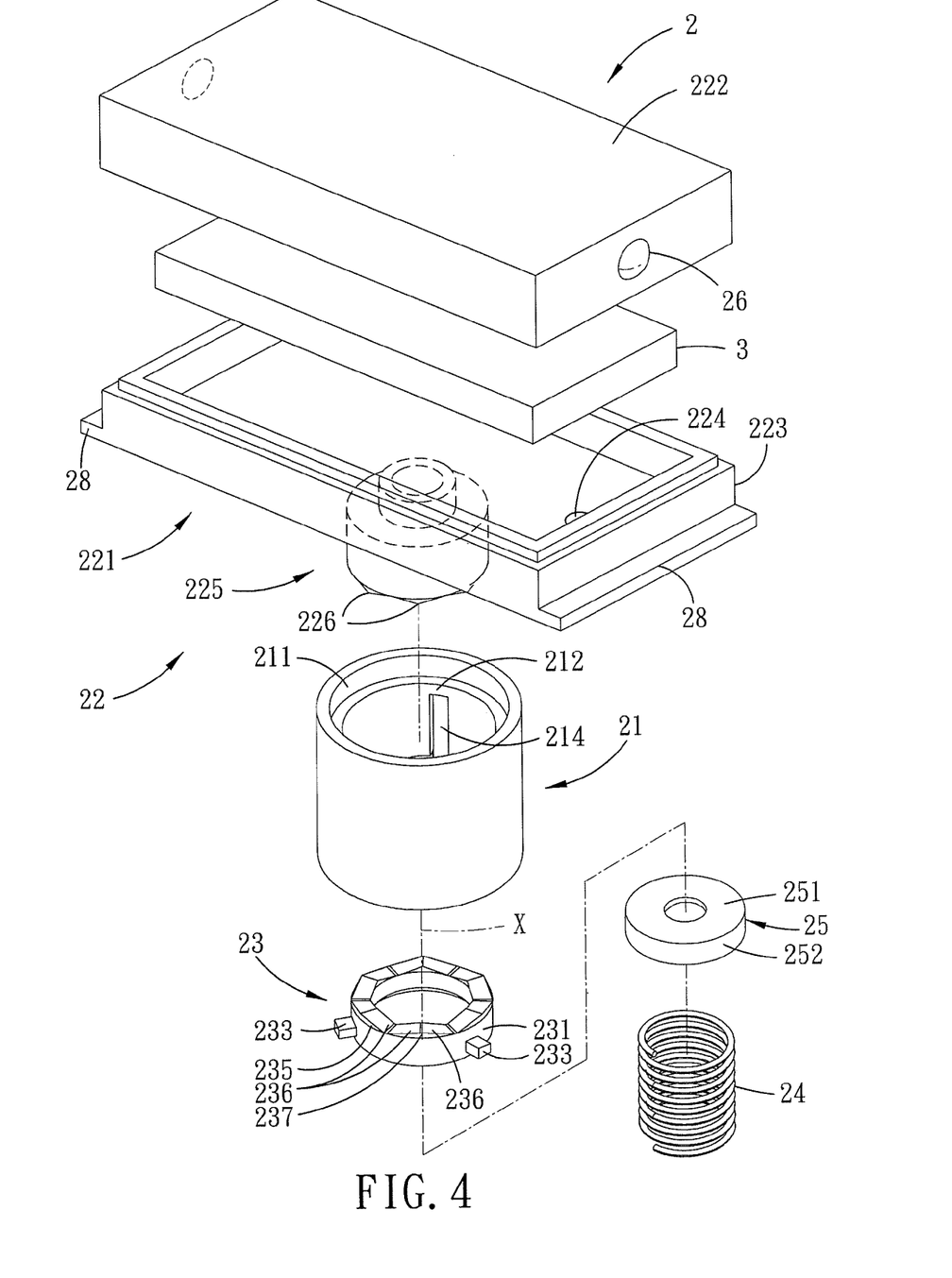
FIG. 4 is an exploded perspective view of the push-push mechanism of the first embodiment.
Figure 5:
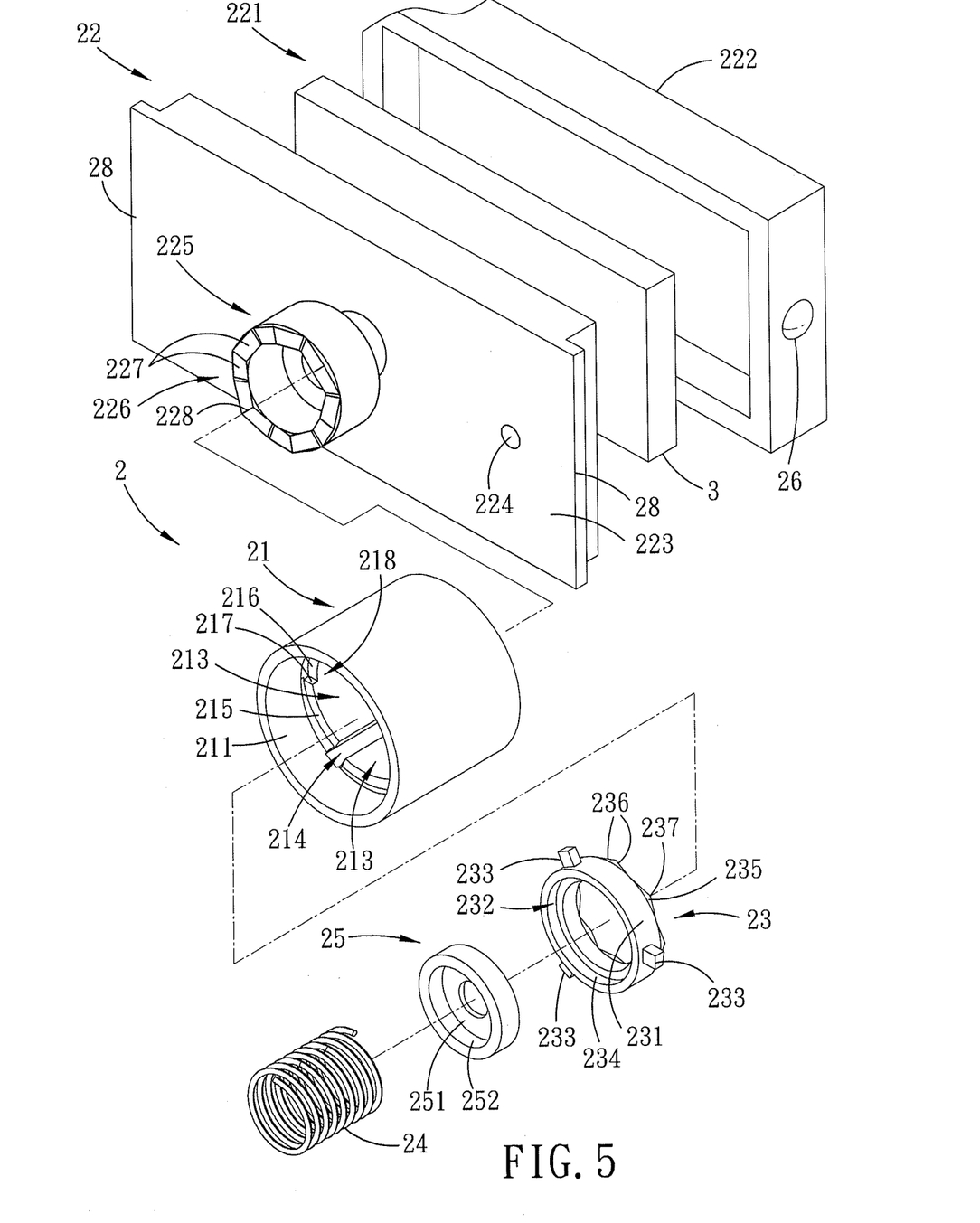
FIG. 5 is another exploded perspective view of the push-push mechanism of the first embodiment.
Figure 6:
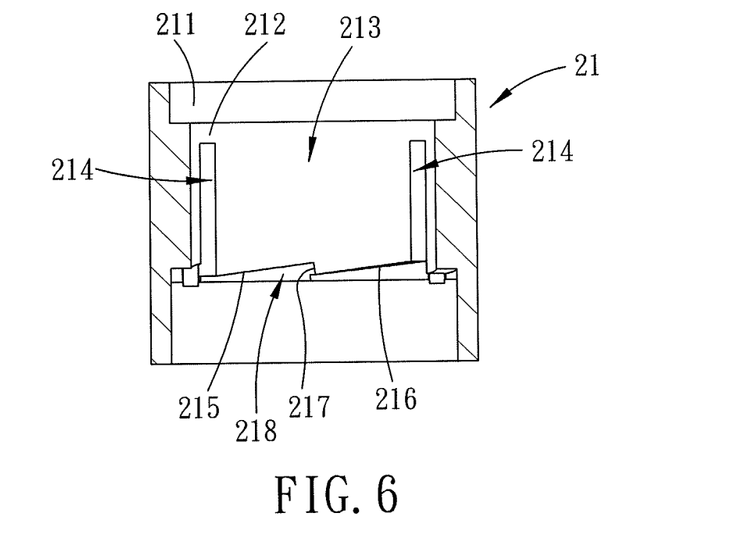
FIG. 6 is a sectional view of a hollow column of the push-push mechanism.

As shown in FIGS. 2 and 3, the case 1 is capable of accommodating electronic elements of the portable electronic device 100, such as a mother board (not shown), a central processor (not shown) and a heat dissipater (not shown). The case 1 includes an outer wall 11 and a supporting wall 12 recessed in the outer wall 11. The supporting wall 12 has a supporting wall portion 121, and a surrounding wall portion 123 extending outwardly from an outer periphery of the supporting wall portion 121 and connected to the outer wall 11. The outer wall 11 has an external surface 111 facing outwardly, an internal surface 112 facing the inside of the case 1, and two inner wall surfaces 113 connecting the external surface 111 and the internal surface 112. The inner wall surfaces 113 define an opening 14 therebetween. In this embodiment, the opening 14 is formed on a lateral side of a lower part of the notebook computer. However, the position of the opening 14 is not limited thereto, and the opening 14 may be formed in a lateral side of an upper part of the notebook computer.

Figure 10:
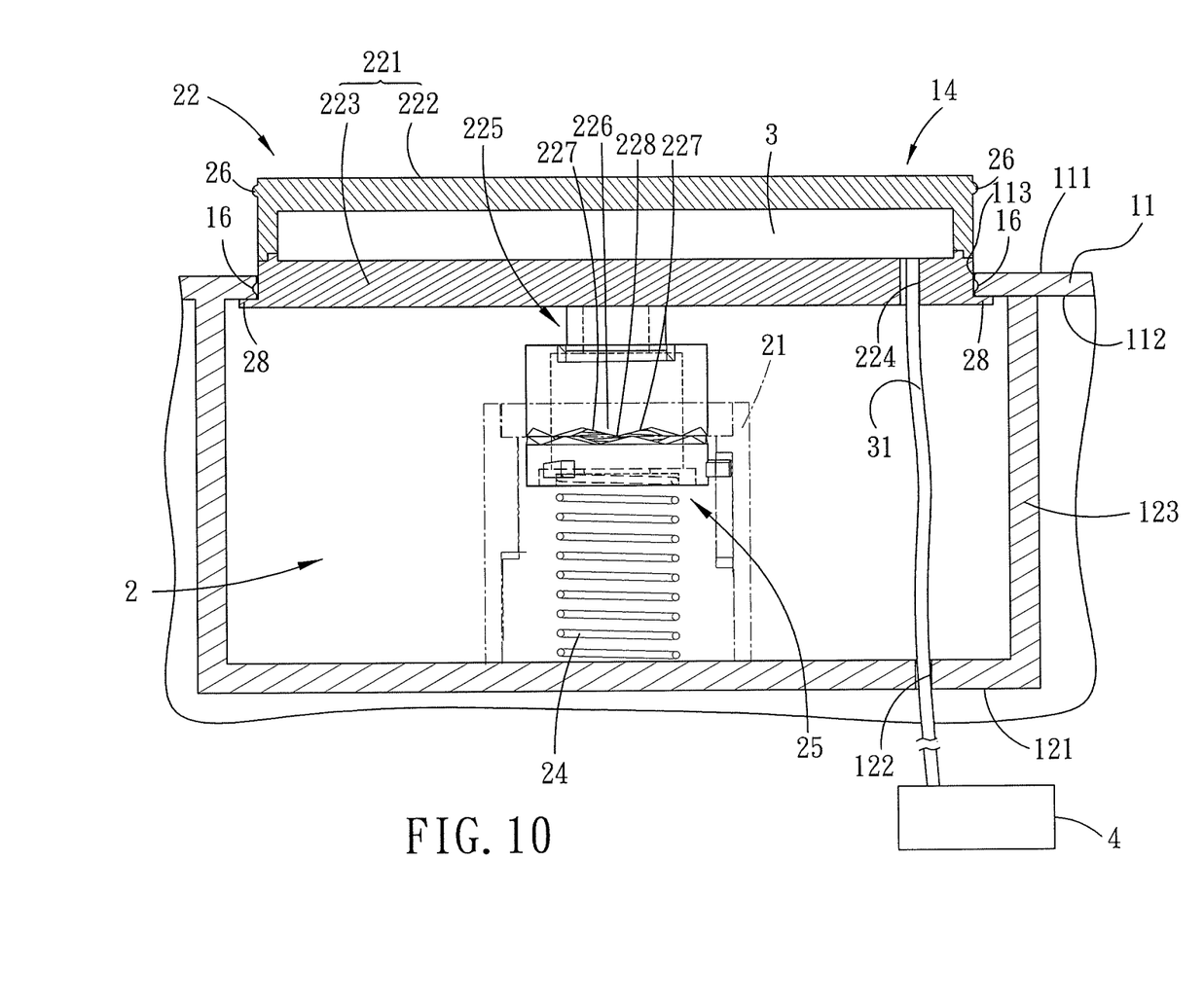
FIG. 10 is another fragmentary sectional view of the first embodiment, illustrating the pushing component at the ejected position, and the antenna is ejected out of the case.

As shown in FIGS. 3, 4, 5 and 6, the push-push mechanism 2 includes a hollow column 21, a pushing component 22, a rotating component 23, a spring 24, and a plate component 25. The hollow column 21 is cylindrical and is mounted on the supporting wall portion 121 of the supporting wall 12. The pushing component 22 has an outer end portion 221 disposed at a position in the outer wall 11 of the case 1 adjacent to the opening 14, and a cylindrical inner end portion 225 extending from the outer end portion 221 into the hollow column 21. The outer end portion 221 is a casing, and includes a retaining member 223 connected to the inner end portion 225, and an outer cover member 222 for enclosing the retaining member 223. The rotating component 23 is rotatably disposed in the hollow column 21 and abuts against the inner end portion 225 of the pushing component 22. The rotating component 23 has a ring member 231 that has an end formed with a receiving groove 232 for accommodating the plate component 25. The plate component 25 has a plate portion 251, and a surrounding portion 252 protruding from an outer periphery of the plate portion 251 toward the supporting wall portion 121. The plate component 25 is sleeved on one end of the spring 24, with the plate portion 251 abutting against one end of the spring 24, and the surrounding portion 252 surrounding and in frictional contact with the spring 24, so that the plate component 25 can be secured on the spring 24 without rotation relative to the spring 24. The spring 24 is a compression spring having the one end that abuts against the plate portion 251 of the plate component 25 and the other end that abuts against the supporting wall portion 121 of the supporting wall 12, and is capable of biasing the rotating component 23 toward the pushing component 22 through the plate component 25, thereby moving the pushing component 22 relative to the hollow column 21 between a received position (as shown in FIG. 3) and an ejected position (as shown in FIG. 10).

Figure 8:
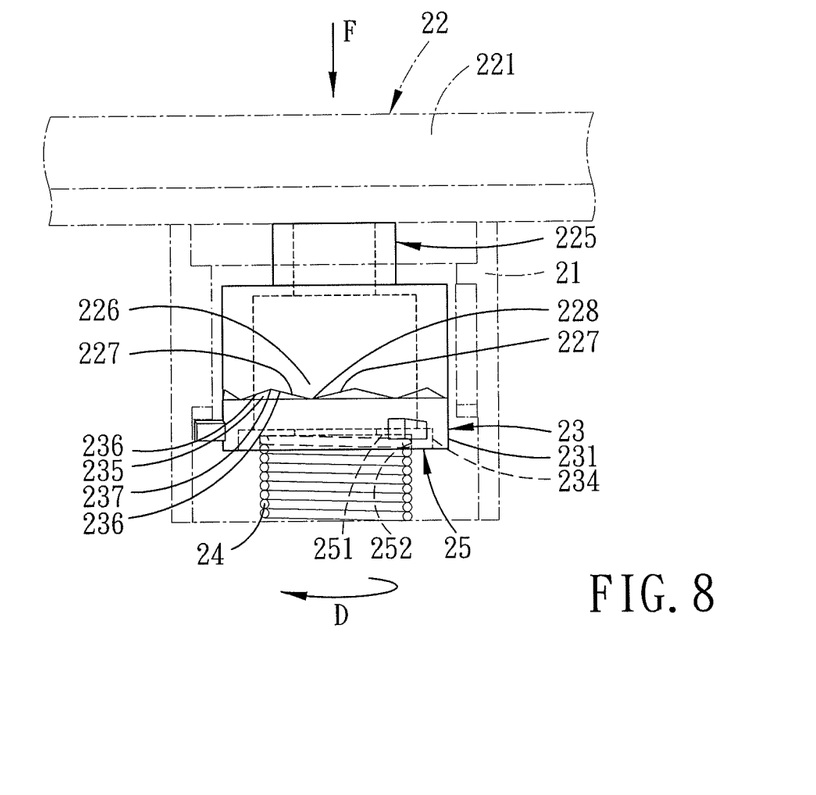
FIG. 8 is a fragmentary schematic view of the first embodiment, illustrating that during the movement from the received position to an ejected position, the pushing component is pressed to drive the rotating component to move inwardly.

The pushing component 22 further has a plurality of first engaging teeth 226 disposed annularly on an inner end of the inner end portion 225. Each of the first engaging teeth 226 is V-shaped, and includes two first inclined surfaces 227 and a first ridge 228 defined by the first inclined surfaces 227. The rotating component 23 further includes a plurality of second engaging teeth 235 disposed annularly on an outer end of the ring member 231. Each of the second engaging teeth 235 is inverted V-shaped, and includes two second inclined surfaces 236, which together define a second ridge 237 in between. The first engaging teeth 226 of the pushing component 22 engage respectively with the second engaging teeth 235 of the rotating component 23, so that when the pushing component 22 is pressed inwardly toward the supporting wall portion 121 of the supporting wall 12, the first ridge 228 of each of the first engaging teeth 226 applies to one of the second inclined surfaces 236 of a corresponding one of the second engaging teeth 235 an inward force to drive inward movement of the rotating component 23 toward the supporting wall portion 121 of the supporting wall 12, and a lateral force to drive the rotating component 23 to rotate about an axis (X) (see FIG. 4) in a predetermined rotational direction (D) (as shown in FIG. 8).

Figure 11:
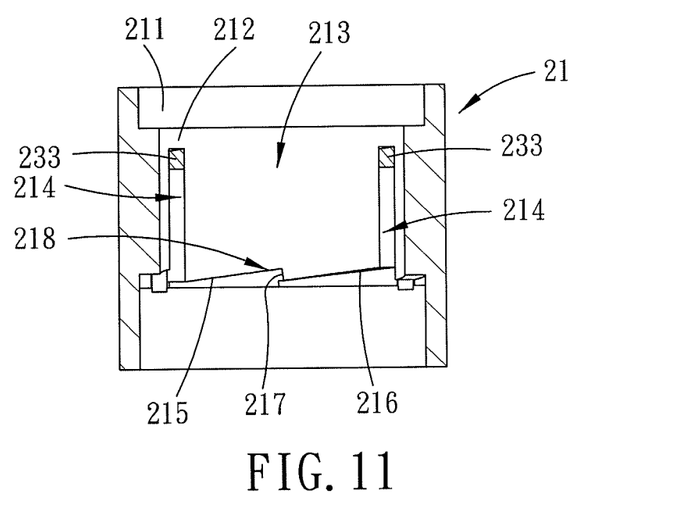
FIG. 11 is another assembled sectional view of the hollow column and the rotating component of the push-push mechanism when the pushing component is at the ejected position.

The hollow column 21 has an inner surrounding surface 211, an inner flange 212 extending radially and inwardly from the inner surrounding surface 211 and adjacent to the outer end of the inner surrounding surface 211, and a plurality of rib members 213 extending from the inner end of the inner flange 212 in a direction away from the opening 14 of the case 1 at equal spacing. Each adjacent pair of the rib members 213 defines a long groove 214 opened toward the supporting wall portion 121. One end of each of the rib members 213 distal from the opening 14 of the case 1 is jagged and has a first oblique guide surface 215, a second oblique guide surface 216 parallel to the first oblique guide surface 215, and a stop surface 217 connected between the first oblique guide surface 215 and the second oblique guide surface 216. The first oblique guide surface 215 and the stop surface 217 cooperate to define a short groove 218 opened toward the supporting wall portion 121 and shorter than the long grooves 214 (i.e., the short grooves 218 are disposed alternately with the long grooves 214). The rotating component 23 further includes a plurality of positioning teeth 233 protruding radially and outwardly from an external surface of the ring member 231. The number of the positioning teeth 233 is the same as the numbers of the long grooves 214 and the short grooves 218. When the pushing component 22 is at the received position, the positioning teeth 233 are engaged respectively with the short grooves 218. When the pushing component 22 is at the ejected position, the positioning teeth 233 are retained respectively in the long grooves 214 and abut respectively against the inner end of the inner flange 212 (as shown in FIG. 11). In this embodiment, each of the numbers of the positioning teeth 233, the long grooves 214 and the short grooves 218 is three. However, the designed numbers may be increased as required.

The case 1 is formed with two first positioning portions adjacent to the opening 14. The outer cover member 222 of the outer end portion 221 of the pushing component 22 is formed with two second positioning portions corresponding to the first positioning positions. In this embodiment, each of the second positioning portions is a semispherical positioning protrusion 26 projecting from a respective one of lateral sides of the outer cover member 222, and each of the first positioning portions is a positioning recess 16 formed in a respective one of the inner wall surfaces 113 of the outer wall 11 and engaged with a respective one of the positioning protrusions 26 when the pushing component 22 is at the received position, such that the pushing component 22 is fastened in the case 1 through the engagement between the positioning recesses 16 and the positioning protrusions 26. The retaining member 223 of the outer end portion 221 of the pushing component 22 is further formed with two limiting protrusions 28 abutting against the internal surface 112 of the case 1 when the pushing component 22 is at the ejected position to stop the pushing component 22 from being detached from the case 1.

The element 3 is disposed in the outer end portion 221 of the pushing component 22. The retaining member 223 and the supporting wall portion 121 are formed respectively with a through hole 224 and a through hole 122. The element 3 is connected electrically to a radio frequency circuit 4 on a mother board (not shown) through a wire 31 extending through the through holes 224, 122. When the pushing component 22 is at the received position, the element 3 is located within and shielded by the case 1. When the pushing component 22 is at the ejected position, the element 3 is ejected out of the case 1 through the opening 14.

Figure 7:
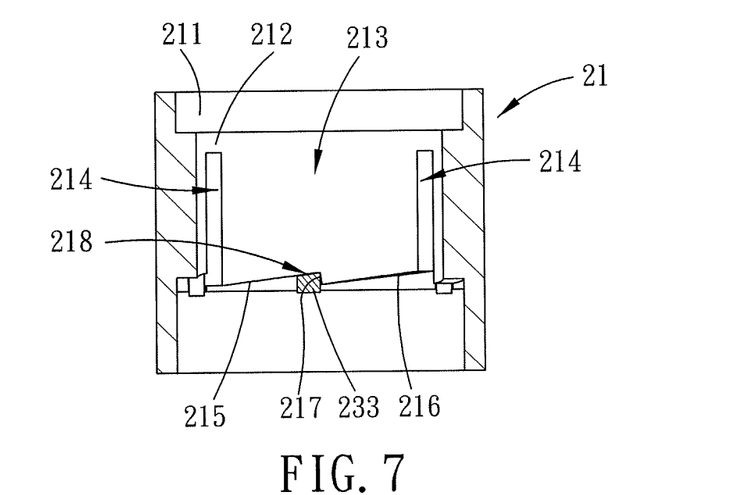
FIG. 7 is an assembled sectional view of the hollow column and a rotating component of the push-push mechanism when the pushing component is at the received position.

As shown in FIGS. 3 and 7, when the pushing component 22 is at the received position, the positioning teeth 233 of the rotating component 23 engage with the short grooves 218 respectively, the first ridge 228 of each of the first engaging teeth 226 of the pushing component 22 abuts against the one of the second inclined surfaces 236 of the corresponding second engaging tooth 235 of the rotating component 23, and the spring 24 is in a compressed state. At this time, the pushing component 22 is positioned in the outer wall 11 of the case 1 with an external surface of the outer cover member 222 being flush with the external surface 111 of the outer wall 11.

Figure 9:
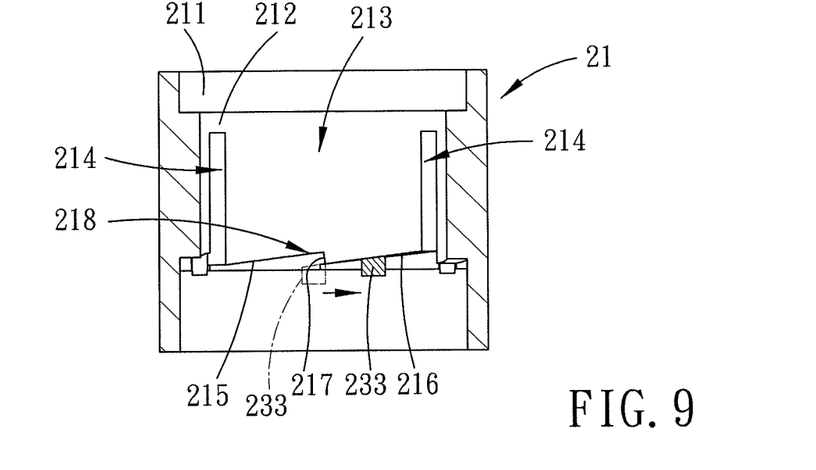
FIG. 9 is another assembled sectional view of the hollow column and the rotating component of the push-push mechanism when the pushing component moves from the received position toward the ejected position.

As shown in FIGS. 3, 8 and 9, during the ejection of the element 3 out of the case 1 through the opening 14, the outer cover member 222 of the pushing component 22 is pressed toward the supporting wall portion 121 in a direction (F) (as indicated by the arrow in FIG. 8), so that the positioning protrusions 26 of the outer end portion 221 are forced to be detached from the positioning recesses 16 of the outer wall 11 of the case 1 to enable the movement of the pushing component 22 toward the supporting wall portion 121. During the movement of the pushing component 22, the rotating component 23 is driven by the first ridges 228 of the first engaging teeth 226 to move toward the supporting wall portion 121, so that the positioning teeth 233 are disengaged respectively from the short grooves 218, and the spring 24 is further compressed by the rotating component 23. At the same time, the rotating component 23 is driven by the lateral forces exerted by the first ridges 228 of the first engaging teeth 226 to rotate about the axis (X) in the predetermined rotational direction (D) when the positioning teeth 233 are detached from the stop surfaces 217 respectively. After the first engaging teeth 226 completely and respectively engage with the second engaging teeth 235, the rotation of the rotating component 23 is arrested. At this time, the positioning teeth 233 move to positions corresponding respectively to the second oblique guide surfaces 216 of the rib members 213. It should be noted that, since the plate component 25 is immovably sleeved on the spring 24, and an internal surrounding surface 234 (see FIG. 5) of the ring member 231 that defines the receiving groove 232 has an inner diameter slightly larger than the outer diameter of the surrounding portion 252 of the plate component 25, the rotating component 23 is in frictional contact with the plate portion 251 of the plate component 25 but is rotatable relative to the plate component 25.

As shown in FIGS. 9, 10 and 11, when the force applied to the outer cover member 222 of the pushing component 22 is released, the rotating component 23 is driven by a resilient restoring force of the spring 24 to push outwardly the pushing component 22 along with the element 3. Each of the positioning teeth 233, when abutting against a corresponding one of the second oblique guide surfaces 216, is guided by the corresponding one of the second oblique guide surfaces 216 to rotate and slide thereon toward a corresponding one of the long grooves 214, and at the same time, each of the second engaging teeth 235 of the rotating component 23 is moved over the first ridge 228 of the next first engaging tooth 226 in the predetermined rotational direction (D). Once the positioning teeth 233 abut respectively against side portions of the rib members 213, the rotation of the rotating component 23 is arrested. Due to the resilient restoring force of the spring 24, the positioning teeth 233 slide outwardly and respectively along the long grooves 214 and abut against the inner end of the inner flange 212, and the pushing component 22 is urged by the rotating component 23 to move outwardly to the ejected position and consequently moves the element 3 out of the case 1. In addition, during the outward movement of the pushing component 22, the positioning protrusions 26 would be moved to and engage respectively with the positioning recesses 16 once again, and the resilient restoring force of the spring 24 is sufficient to disengage the positioning protrusions 26 from the positioning recesses 16, so that the pushing component 22 can continuously move to the ejected position. After being ejected out of the case 1, the element 3 is not shielded by the case 1, thereby achieving good signal transmission and receiving efficiency.

Figure 12:
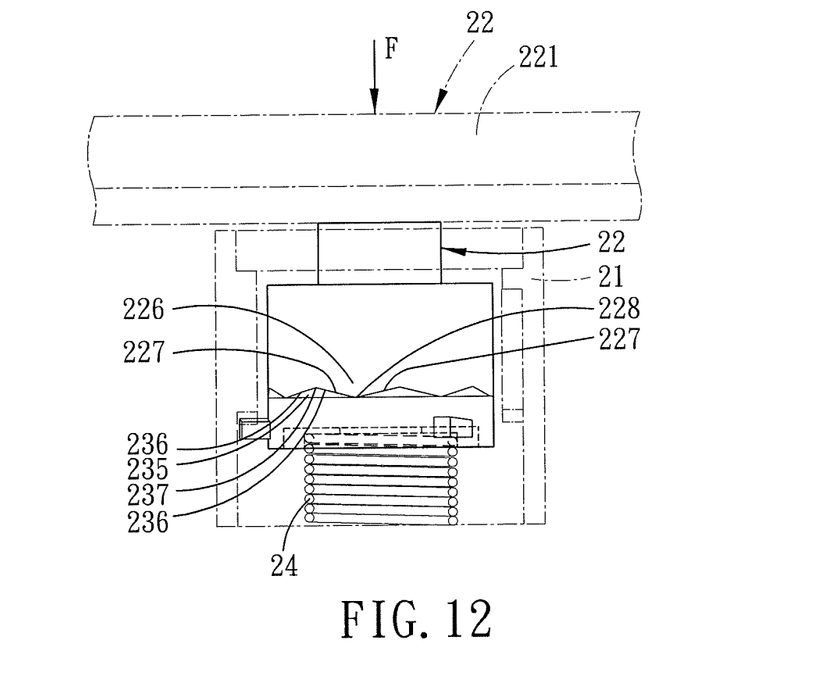
FIG. 12 is another fragmentary schematic view of the first embodiment, illustrating that during the movement from the ejected position to the received position, the pushing component is pressed to drive the rotating component to move inwardly.
Figure 13:
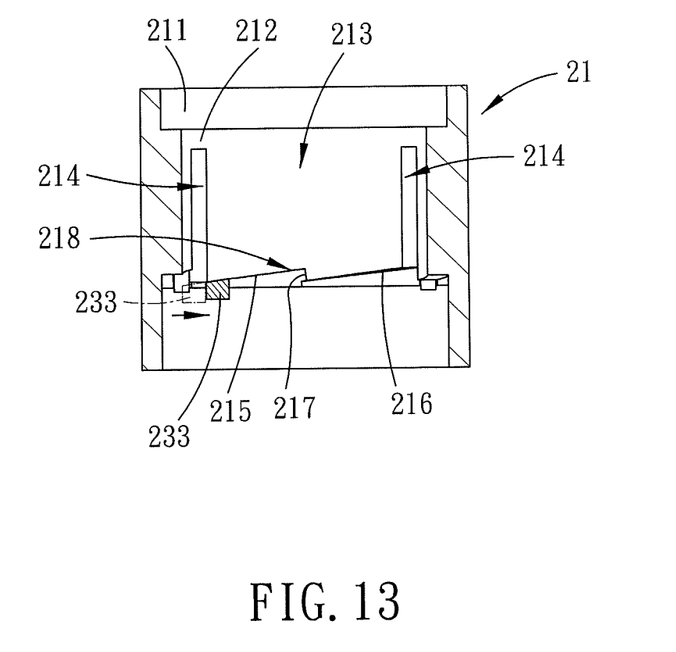
FIG. 13 is still another assembled sectional view of the hollow column and the rotating component of the push-push mechanism when the pushing component moves from the ejected position toward the received position.

As shown in FIGS. 10, 12 and 13, during the movement of the pushing component 22 from the ejected position to the received position for retracting the element 3 into the case 1, the outer end portion 221 of the pushing component 22 is pressed toward the supporting wall portion 121 in the direction (F), the first ridge 228 of each of the first engaging teeth 226 applies an inward force to the second inclined surface 236 of the corresponding second engaging tooth 235 to drive inward movement of the rotating component 23, thereby detaching the positioning teeth 233 from the long grooves 214, and compressing the spring 24. At the same time, the first ridge 228 of each of the first engaging teeth 226 applies a lateral force to the second inclined surface 236 of the corresponding second engaging tooth 235 to drive the rotating component 23 to rotate about the axis (X) in the predetermined direction (D) after the positioning teeth 233 are detached from the long grooves 214. Once the first engaging teeth 226 of the pushing component 22 are completely and respectively engaged with the second engaging teeth 235 of the rotating component 23, the rotation of the rotating component 23 is arrested. At this time, each of the positioning teeth 233 moves to the first oblique guide surface 215 of the next one of the rib members 213 in the predetermined rotational direction (D).

As shown in FIGS. 3, 7 and 13, when the force applied to the outer end portion 221 of the pushing component 22 is released, the resilient restoring force of the spring 24 drives the rotating component 23 to push outwardly the pushing component 22. Each of the positioning teeth 233, when abutting against the next one of the first oblique guide surfaces 215, is guided by the next one of the first oblique guide surfaces 215 to rotate and slide thereon toward a next one of the short grooves 218 in the predetermined rotational direction (D), and at the same time, each of the second engaging teeth 235 of the rotating component 23 is moved over the first ridge 228 of the next first engaging tooth 226 in the predetermined rotational direction (D). Once each of the positioning teeth 233 engages with the next one short groove 218 in the predetermined rotational direction (D) by abutting against the stop surface 217 thereof, the rotation of the rotating component 23 is stopped. At this time, the pushing component 22 returns to the received position as shown in FIG. 3, and the element 3 is located within the case 1.

Figure 14:
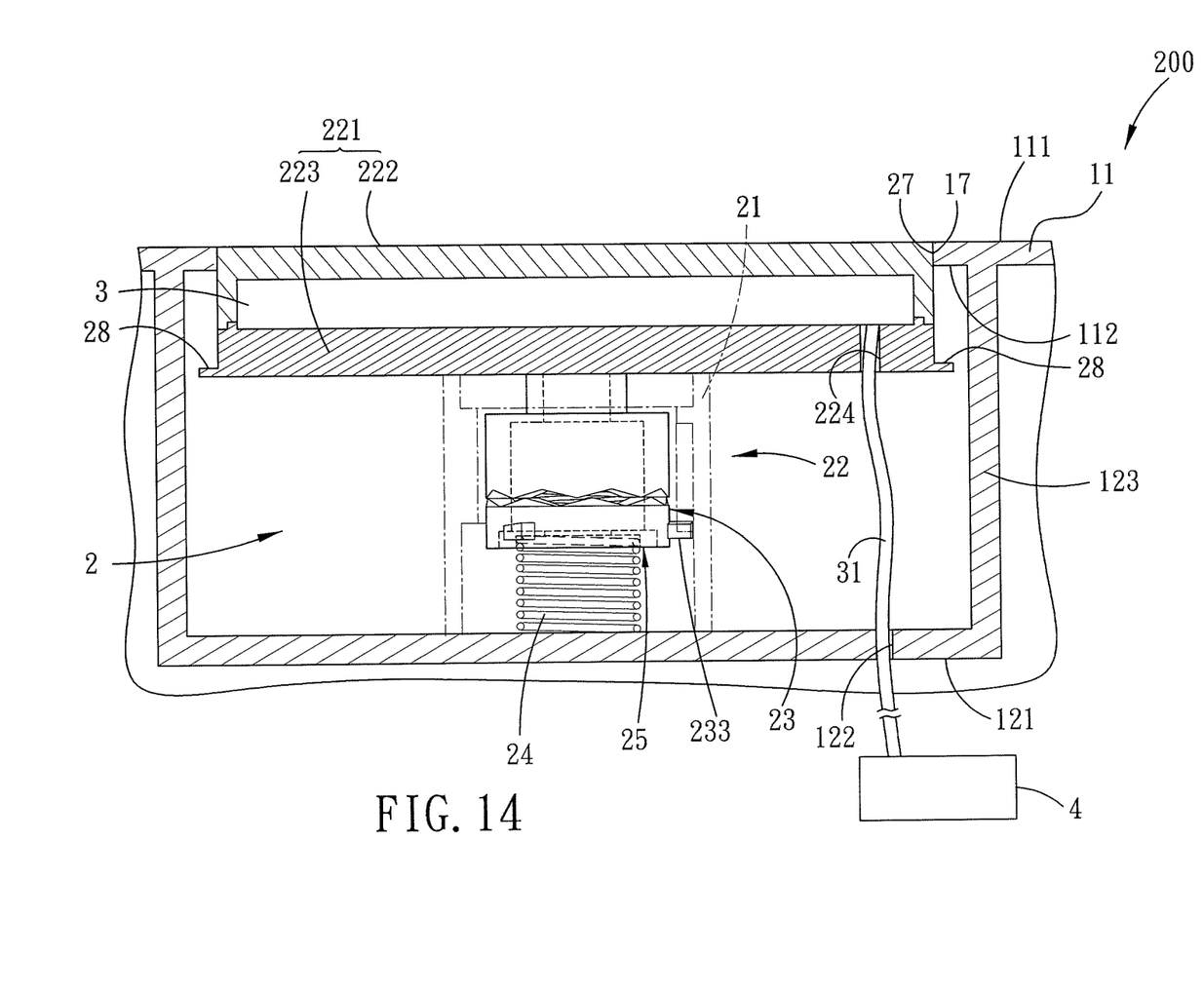
FIG. 14 is a fragmentary sectional view of a second embodiment of the portable electronic device according to the present invention.

FIG. 14 shows a second embodiment of the portable electronic device according to the present invention. The second embodiment is similar to the first embodiment, except that the first positioning portion and the second positioning portion of the portable electronic device 200 are configured as a first positioning surface 17 and a second positioning surface 27, respectively. The first positioning surface 17 and the second positioning surface 27 are in frictional contact to be positioned relative to each other.

To sum up, in the portable electronic devices 100, 200 of the present embodiments, through the installation of the push-push mechanism 2, a user only needs to press inwardly the pushing component 22 at the received position by a distance, so that the pushing component 22 can be ejected to the ejected position and the element 3 can be ejected out of the case 1. The user can also press inwardly the pushing component 22 at the ejected position by a distance, so that the pushing component 22 can be moved to the received position and the element 3 can be moved into the case 1.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A portable electronic device comprising:
   a case formed with an opening;
   a push-push mechanism including:
     a hollow column that is disposed in said case, and that has an inner surrounding surface, a plurality of angularly spaced-apart long grooves formed in said inner surrounding surface, and a plurality of short grooves formed in said inner surrounding surface, disposed alternately with said long grooves and shorter than said long grooves,
     a pushing component that has an outer end portion disposed in said case at a position adjacent to said opening, an inner end portion extending from said outer end portion into said hollow column, and a plurality of first engaging teeth disposed annularly on said inner end portion,
     a rotating component that is movably disposed in said hollow column and that includes a ring member, a plurality of positioning teeth protruding radially and outwardly from an external surface of said ring member, and a plurality of second engaging teeth disposed annularly on said ring member and abutting against said first engaging teeth, and
     a spring that is disposed in said hollow column and that biases said rotating component toward said pushing component; and
   an element that is connected to said outer end portion of said pushing component;
   wherein said pushing component is capable of moving relative to said hollow column between a received position, where said positioning teeth engage respectively with said short grooves and said element is located within said case, and an ejected position, where said positioning teeth are slidably and respectively received in said long grooves and said element is ejected out of said case through said opening.

2. The portable electronic device of claim 1, wherein said case is formed with a first positioning portion adjacent to said opening, and said outer end portion of said pushing component is formed with a second positioning portion corresponding to said first positioning position, such that when said pushing component is at the received position, said pushing component is fastened in said case through engagement between said first positioning portion and said second positioning portion.

3. The portable electronic device of claim 2, wherein one of said first positioning portion and said second positioning portion is a positioning protrusion, and the other one of said first positioning portion and said second positioning portion is a positioning recess engaged with said positioning protrusion when said pushing component is at the received position.

4. The portable electronic device of claim 2, wherein each of said first positioning portion and said second positioning portion is a positioning surface, said first and second positioning portions being in frictional contact with each other when said pushing component is at the received position.

5. The portable electronic device of claim 2, wherein said outer end portion of said pushing component is further formed with at least one limiting protrusion abutting against an internal surface of said case when said pushing component is at the ejected position.

6. The portable electronic device of claim 5, wherein said push-push mechanism further includes a plate component sleeved on one end of said spring, said rotating component being sleeved on said plate component, said case including an outer wall that has said internal surface, and a supporting wall that is recessed in said outer wall, the other end of said spring abutting against said supporting wall.

7. The portable electronic device of claim 6, wherein, when said pushing component moves from the received position to the ejected position, said rotating component moves toward said opening of said case and rotates about an axis of said rotating component in a predetermined rotational direction, and when said pushing component moves from the ejected position to the received position, said rotating component moves away from said opening and rotates about the axis in the predetermined rotational direction.

8. The portable electronic device of claim 7, wherein said hollow column further has an inner flange extending radially and inwardly from said inner surrounding surface, and a plurality of rib members extending from said inner flange in a direction away from said opening of said case, each of said long grooves being defined between an adjacent pair of said rib members, each of said short grooves being defined at one end of a respective one of said rib members distal from said opening of said case, each of said positioning teeth abutting against said inner flange when said pushing component is at the ejected position.

9. The portable electronic device of claim 8, wherein each of said first engaging teeth is V-shaped and has two first inclined surfaces and a first ridge defined by said two first inclined surfaces, and each of said second engaging teeth is inverted V-shaped and has two second inclined surfaces, said first ridge of each of said first engaging teeth abutting against one of said two second inclined surfaces of a respective one of said second engaging teeth, so that when said pushing component is pressed, said rotating component rotates about said axis in said predetermined rotational direction.

10. The portable electronic device of claim 9, wherein said end of each of said rib members distal from said opening of said case has a first oblique guide surface, a second oblique guide surface and a stop surface connected between said first oblique guide surface and said second oblique guide surface, said first oblique guide surface of each of said rib members being disposed for guiding sliding movement of a respective one of said positioning teeth thereon when said pushing component is moved from the ejected position to the received position, said second oblique guide surface of each of said rib members being disposed for guiding sliding movement of the respective one of said positioning teeth thereon when said pushing component is moved from the received position to the ejected position, said first oblique guide surface and said stop surface cooperating with each other to define said short groove.

11. The portable electronic device of claim 10, further comprising a radio frequency circuit accommodated in said case, said outer end portion of said pushing component being a hollow casing that is formed with a through hole, said element being an antenna that is disposed in said hollow casing, and that is connected electrically to said radio frequency circuit through a wire extending through said through hole.

* * * * *